No. 768,606. PATENTED AUG. 30, 1904.
M. T. A. KUBIERSCHKY & P. E. HERKNER.
SUSPENSION OF TROLLEY WIRES.
APPLICATION FILED MAR. 7, 1902.
NO MODEL. 4 SHEETS—SHEET 1.
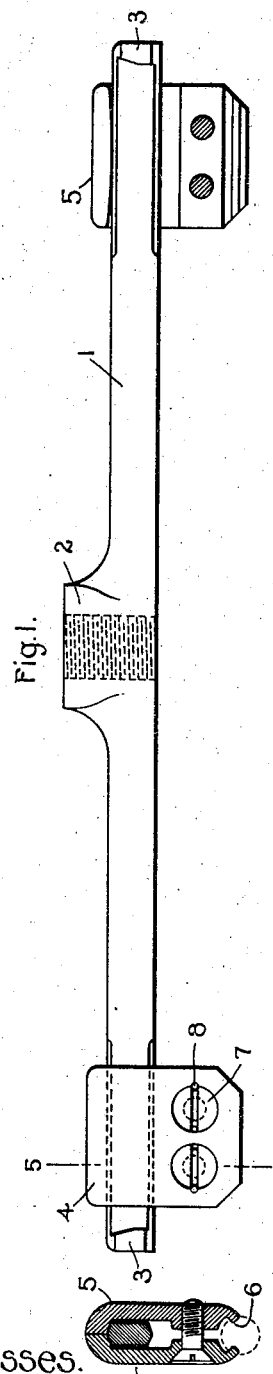
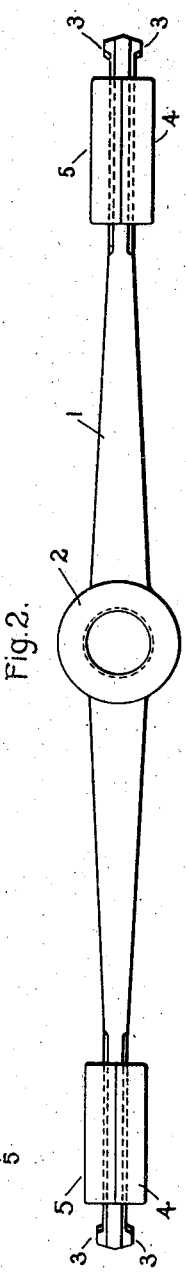
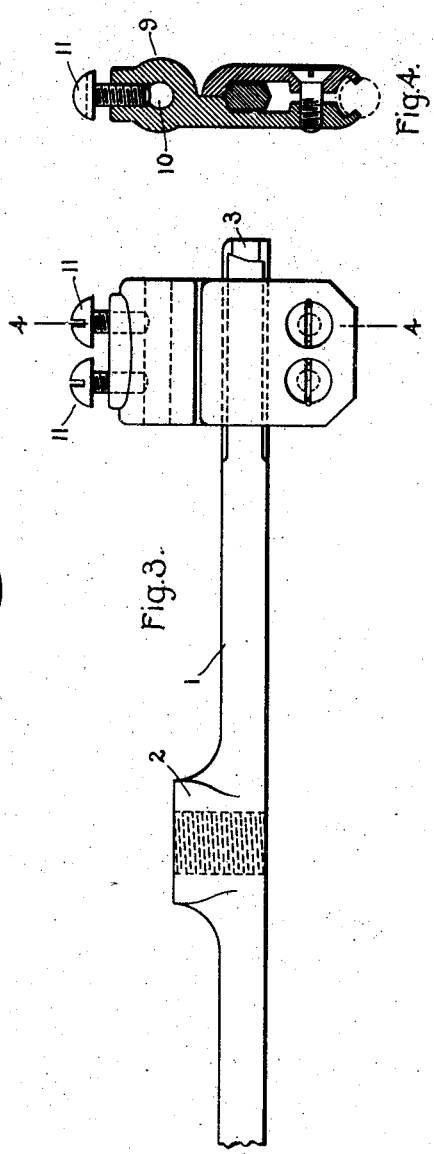
Witnesses.
Inventors.
Martin T.A.Kubierschky,
Paul E.Herkner,
by
Atty.

No. 768,606. PATENTED AUG. 30, 1904.
M. T. A. KUBIERSCHKY & P. E. HERKNER.
SUSPENSION OF TROLLEY WIRES.
APPLICATION FILED MAR. 7, 1902.
NO MODEL. 4 SHEETS—SHEET 2.
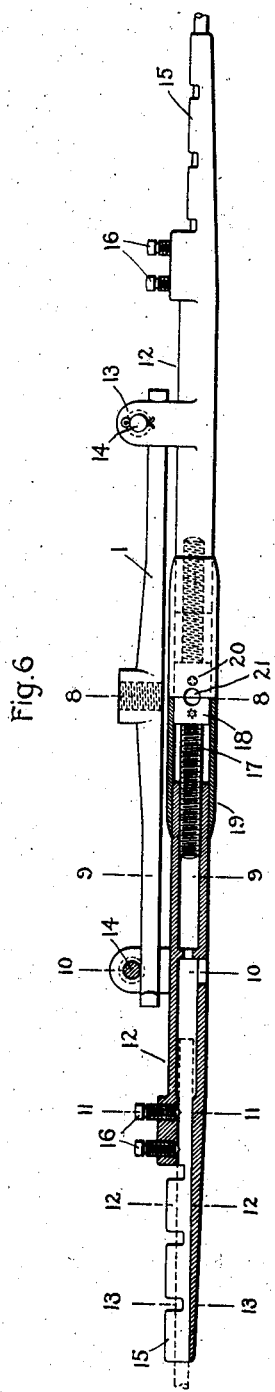
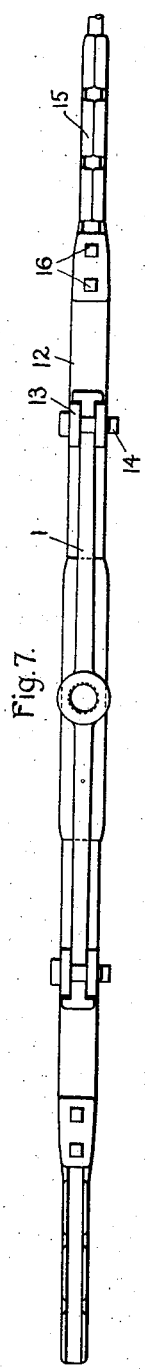
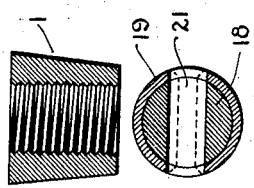
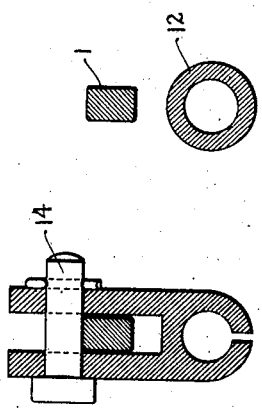
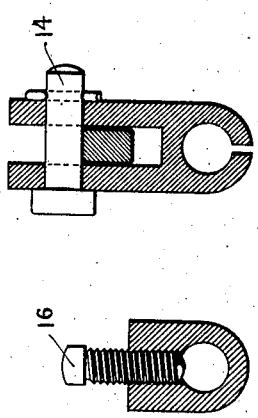
Witnesses.
Inventors.
Martin T. A. Kubierschky,
Paul E. Herkner,
by
Atty.

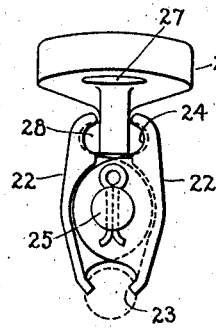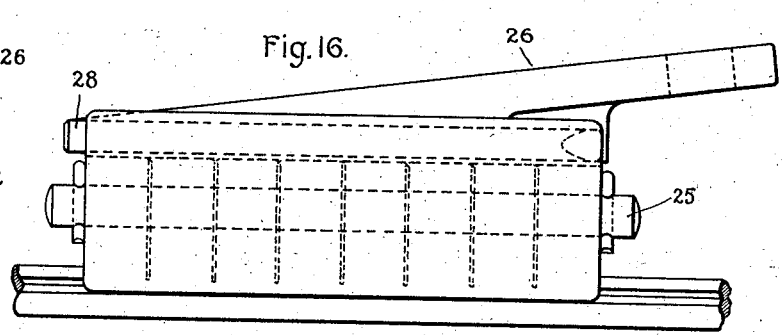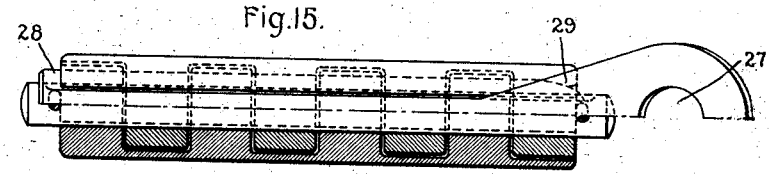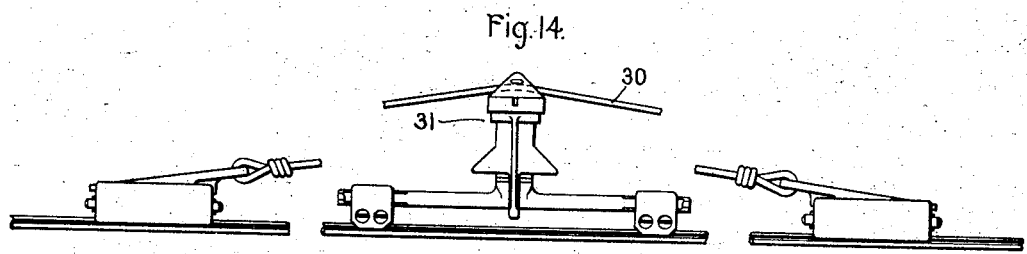

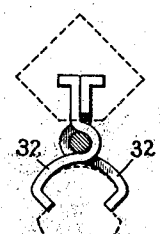
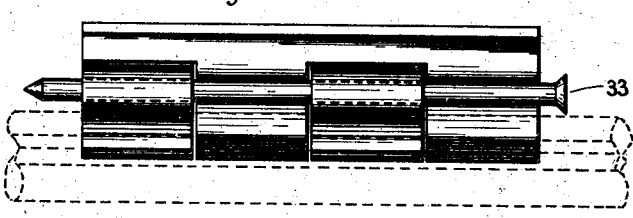
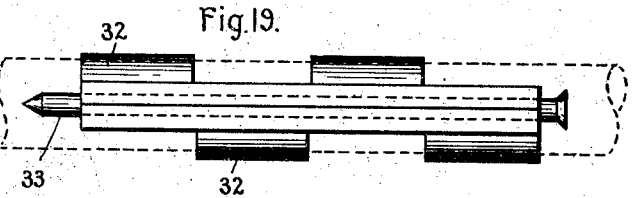

No. 768,606.

Patented August 30, 1904.

UNITED STATES PATENT OFFICE.

MARTIN T. A. KUBIERSCHKY AND PAUL E. HERKNER, OF BERLIN, GERMANY.

SUSPENSION OF TROLLEY-WIRES.

SPECIFICATION forming part of Letters Patent No. 768,606, dated August 30, 1904.

Application filed March 7, 1902. Serial No. 97,046. (No model.)

*To all whom it may concern:*

Be it known that we, MARTIN T. A. KUBIERSCHKY and PAUL E. HERKNER, subjects of the Emperor of Germany, and residents of Berlin, Germany, have invented certain new and useful Improvements in Suspension of Trolley-Wires, of which the following is a specification.

Our present invention relates to improved means for suspending and supporting wires used as electric conductors for trolley-cars and like purposes.

As is well known, the method heretofore in use for connecting the trolley-wire to its supporting devices has consisted either in rigidly clamping the supporting devices upon the wire or connecting the same thereto by soldering. When solder is used, the temper of the wire is affected during the soldering operation and its molecular strength impaired, and when the supporting device is rigidly clamped to the wire there is a tendency for the wire to break near the rigid clamp, due to the continual and abrupt flexure of the wire at such points, caused by the constant vibration in its free spans, which are produced in a vertical direction by the trolley pressing upward against the under side and in a horizontal direction by the action of the wind thereon.

The object of our invention is to provide means whereby we overcome the above objections; and to this end our invention consists in certain means of connection between the supports and the wire whereby the wire is free to vibrate in any direction without producing unnatural curves or abrupt bends in the wire at any point and which at the same time secures the wire in its proper position.

The invention will be more readily understood by reference to the accompanying drawings, in which—

Figure 1 is a side elevation of our improved ear with one of the right-hand wire-clamp plates removed. Fig. 2 is a top plan view of the same. Fig. 3 shows in side elevation a portion of the supporting-bar with a wire-clamp thereon adapted to receive a feed-wire or lightning-arrester lead. Fig. 4 is a vertical section on line 4 4 of Fig. 3. Fig. 5 is a vertical section on line 5 5 of Fig. 1. Fig. 6 is a vertical sectional elevation of our improved ear modified to operate as a tension-adjusting device. Fig. 7 is a plan of the same. Figs. 8 to 13 are transverse sections thereof on the corresponding section-lines marked on Fig. 6. Fig. 14 shows in broken elevation a further modification of our improved ear adapted to be used in connection with safety devices. Fig. 15 is an enlarged sectional plan of a safety device. Fig. 16 is a side elevation of the same. Fig. 17 is an end elevation thereof. Fig. 18 is a side elevation of a fastening device for telephone-guards used in connection with our ears. Fig. 19 is a top plan thereof, and Fig. 20 is an end elevation of the same.

The main supporting-bar 1 is provided at its middle with a shouldered enlargement 2, vertically drilled and tapped in the ordinary way to make connection with any kind of insulator. The bar 1 is provided with parallel sides and rounded corners for a portion of its length near each end and transverse lugs 3 at its extreme ends for supporting and holding the wire-clamps in position. The wire-clamps consist of two plates 4 and 5, adapted to loosely surround an end of the supporting-bar 1 and abut against each other at their upper edges. The lower edges of said plates 4 and 5 are provided with tong-shaped jaws 6, adapted to take into the grooves of the trolley-wire. The plate 4 is drilled and countersunk intermediate its ends to receive the head end of two screws 7, and plate 5 is correspondingly drilled and tapped to receive the thread end of said screws. After the screws have been turned home they may be locked in place by prick-punching the metal of the clamp-plate at 8, so as to upset the same into the end of the slat in the screw-head. When it is desired to use the wire-clamp as a feed-wire or lightning-arrester connection, one of the plates is provided with an upward extension 9, as shown in Fig. 4, and said extension is provided with a longitudinal hole 10 and set-screws 11 for clamping the connecting-wire therein. In connecting the clamps to the wire care is taken to position them upon the wire so that they will not normally abut against the lugs 3, but will stand in from them, as shown in Fig. 1, so that when the wire is swayed up and down or sidewise the clamps will be free to move longitudinally as well as sidewise with relation to the supporting-bar.

In order to adjust the tension of the trolley-wire so that the supporting-ears may be brought into proper adjustment without releasing the individual wire-clamps, we propose to introduce at intervals along the wire means for increasing or decreasing the tension of the wire when necessary to bring about proper relation between the supporting-bars and wire-clamps. This adjusting means, as shown in Figs. 6 to 13, includes a supporting-bar 1, like that above described, upon both ends of which are suspended tubular wire-clamps 12, having upstanding ears 13 adapted to receive bearing-pins 14, which rest upon the upper edge of supporting-bar 1. Each tubular wire-clamp 12 is provided with a flexible grooved end having upwardly-projecting lugs 15 adapted to be bent down upon the wire, as shown at the right in Figs. 6 and 7. The central section is cored out and provided with set-screws 16 for binding the end of the wire in position. The inner end is drilled and tapped for the reception of an end of the buckle-screw 17. The buckle-screw 17 is both right and left handedly threaded and provided with an enlarged middle section 18. Surrounding the buckle-screw is a sleeve 19, adapted to receive the inner end of the tubular wire-clamps 12 and which is securely connected to the enlarged section 18 of the screw by rivets 20, passing through both. The sleeve 19 and screw enlargement 18 are pierced by a transverse hole 21 for the reception of a lever or other means for rotating said screw and sleeve to produce tension or slackness of the wire.

In places where the wire-clamps are restricted in their freedom of movement in relation to the supporting-bar, as at curves and switches, we provide safety devices which operate to hold the wire in case it should break in proximity to the supporting-ear. These safety devices consist, as shown in Figs. 14 to 17, in additional wire-clamps, one on either side of the ear, connected by a common tension member extending over the insulated support of the ear. As shown, these safety wire-clamps consist of a series of connected interchangeable and interlocking jaws 22, provided with tong-shaped ends 23 at their lower edges for engaging the grooved wire and grooves 24 near their upper edges. These jaws 22 are pivoted upon a common shaft 25 and are supported by tie-bracket 26. The tie-bracket 26 has an inclined upper edge enlarged at one end and provided with an eye 27. The lower edge of said bracket, which is adapted to be engaged by the jaws 22, consists of a horizontal web 28, having substantially parallel sides throughout a greater portion of its length and drawing in at 29 near the enlarged end of the bracket to form a wedge. The grooves 24 in the upper edge of the jaws 22 are made correspondingly shallower near one end in order to coöperate with the wedge-shaped end 29 of the web. It is to be understood that the web 28 may equally well be made to taper throughout its length, the function being, as is apparent, to cause the jaws 22 to grip the wire more tightly the greater the strain, which tends to draw the jaws away from the tie-bracket 26. The tie-rod 30 is connected to the eyes 27 of the opposite brackets 26 and passes over the insulator 31 of the supporting-ear and operates to transmit the strain that may be put upon one safety device to the device upon the opposite side of the ear to the main wire. It is to be noted that these safety devices are in no way rigidly connected to any part and accordingly do not interfere with the free swaying and bending of the trolley-wire.

In order to support protector-guards upon trolley-wires without interference with its freedom of movement, we provide a support, such as shown in Figs. 18 to 20, consisting of two interchangeable interlocking jaws 32, of sheet metal, having continuous integral webs connecting their upper ends and bent longitudinally at right angles. The jaws 32 are bent at their middle and are held together upon the trolley-wire by a pin or rod 33, engaging the bent portions of the oppositely-bent jaws. The upper edges of the connecting-web abut each other, and the outwardly-bent portions provide means for securing insulating material thereto.

What we claim as new, and desire to secure by Letters Patent of the United States, is—

1. The combination with a supporting-bar, of wire-clamping means carried at each end of said bar and adapted to move transversely and longitudinally thereon.

2. The combination with a supporting-bar, of wire-clamping means carried at each end of said bar and adapted to move transversely and longitudinally thereon, and means to limit said movements.

3. The combination of a supporting-bar having its ends provided with transverse lugs, and wire-clamps carried at each end of said bar and adapted to move freely transversely and longitudinally thereon.

4. The combination with a supporting-bar, of wire-clamps loosely surrounding the ends of said bar, each consisting of two plates having bent-over abutting upper edges, jaw-shaped lower edges and tension devices intermediate their upper and lower edges.

5. The combination with a supporting-bar, of wire-clamping devices carried at each end thereof, and a turnbuckle for adjusting said clamping devices.

6. The combination with a supporting-bar, of wire-clamping devices loosely supported at each end thereof, and means for adjusting the positions of said devices.

7. The combination with a supporting-bar, of wire-clamping devices supported thereby, a turnbuckle operatively engaging said clamping devices, and a sleeve for stiffening and protecting the joint between the said devices.

In witness whereof we have hereunto set our hands this 18th day of February, 1902.

MARTIN T. A. KUBIERSCHKY.
PAUL E. HERKNER.

Witnesses:
HENRY HASPER,
FRANK H. MASON.